United States Patent
Jain et al.

(10) Patent No.: US 10,541,615 B1
(45) Date of Patent: Jan. 21, 2020

(54) DEVICE, METHOD AND SYSTEM TO MITIGATE A VOLTAGE OVERSHOOT EVENT

(71) Applicant: Intel Corporation, Santa Clara, CA (US)

(72) Inventors: Amit Jain, Portland, OR (US); Sameer Shekhar, Portland, OR (US); Alexander Lyakhov, Portland, OR (US); Jonathan P. Douglas, Portland, OR (US); Vivek Saxena, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/021,712

(22) Filed: Jun. 28, 2018

(51) Int. Cl.
*H02M 3/158* (2006.01)

(52) U.S. Cl.
CPC ................... *H02M 3/1584* (2013.01)

(58) Field of Classification Search
CPC .................................................. H02M 3/158
See application file for complete search history.

(56) References Cited

U.S. PATENT DOCUMENTS

| | | | |
|---|---|---|---|
| 7,498,782 B2 | 3/2009 | Nguyen et al. | |
| 7,570,036 B2 | 8/2009 | Tang et al. | |
| 9,696,350 B2 | 7/2017 | Burton et al. | |
| 2010/0109622 A1 | 5/2010 | Miki et al. | |
| 2012/0286679 A1* | 11/2012 | Liu | H05B 33/0827 315/193 |
| 2015/0115910 A1* | 4/2015 | Jiang | H02M 3/1584 323/271 |
| 2017/0179822 A1 | 6/2017 | Kobayashi et al. | |
| 2017/0187285 A1 | 6/2017 | Kim et al. | |
| 2018/0175734 A1* | 6/2018 | Gherghescu | H02M 3/1588 |

FOREIGN PATENT DOCUMENTS

| | | |
|---|---|---|
| JP | 2006014581 | 1/2006 |
| WO | 2015169689 | 11/2015 |

OTHER PUBLICATIONS

International Search Report & Written Opinion dated Sep. 19, 2019 for PCT Patent Application No. PCT/US2019/034101.

* cited by examiner

*Primary Examiner* — Jue Zhang
*Assistant Examiner* — Trinh Q Dang
(74) *Attorney, Agent, or Firm* — Green, Howard & Mughal LLP

(57) ABSTRACT

Techniques and mechanisms for mitigating an overshoot of a supply voltage provided with a voltage regulator (VR). In an embodiment, buck converter functionality of a VR is provided with first circuitry comprising a first inductor and first switch circuits variously coupled thereto. Second circuitry of the VR comprises a second inductor and second switch circuits variously coupled thereto. In response to an indication of a voltage overshoot condition, respective states of the first switch circuits and the second switch circuits are configured to enable a conductive path for dissipating energy with the first inductor, the second inductor, and various ones of the first switch circuits and the second switch circuits. In another embodiment, mitigating the voltage overshoot condition comprises alternately toggling between two different configurations of the second switch circuits.

23 Claims, 9 Drawing Sheets

200

210 — Providing a first voltage via a first node to a VR which comprises inductors L1 and L2 coupled to the first node via switch circuits S1 and S3, respectively, wherein a second node is coupled to switch circuits S1 and S3 via inductors L1 and L2, respectively, wherein inductors L1 and L2 are further coupled to a third node via switch circuits S2 and S4, respectively

220 — With the VR, providing a second voltage via the second node to a load circuit, the second voltage based on the first voltage, including conducting current with inductor L1 during respective off-states of switch circuits S2, S3, and S4

230 — Detecting an indication of a voltage overshoot condition

240 — In response to the indication, enabling a current path between inductor L1 and one of first node or the third node via the second node and inductor L2, including providing respective on-states of switch circuit S2 and one of switch circuits S3 or S4

FIG. 2

DEVICE, METHOD AND SYSTEM TO MITIGATE A VOLTAGE OVERSHOOT EVENT

BACKGROUND

1. Technical Field

The present invention relates generally to the regulation of a supply voltage and more specifically, but not exclusively, to circuitry for mitigating a voltage overshoot condition.

2. Background Art

A DC-to-DC voltage regulator typically is used to convert a DC input voltage to either a higher or a lower DC output voltage. Various types of switching voltage regulators are often used in integrated circuit (IC) applications due to their small size and efficiency. A switching regulator typically includes one or more switches that are rapidly opened and closed to transfer energy between an inductor (a stand-alone inductor or a transformer, as examples) and an input voltage source in a manner that regulates an output voltage.

Successive generations of IC architectures continue to trend toward better power efficiency at lower operational voltages. Unfortunately, these architectures are also more prone to supply voltages overshooting to levels much higher—e.g., in the range of 1.5V to 2.0V—than those which allow for acceptable reliability and lifetime of circuit components. As semiconductor fabrication processes continue to enable more power dense solutions, voltage overshoot events are expected to have an increasing impact on IC performance.

BRIEF DESCRIPTION OF THE DRAWINGS

The various embodiments of the present invention are illustrated by way of example, and not by way of limitation, in the figures of the accompanying drawings and in which:

FIG. 2 is a flow diagram illustrating elements of a method to mitigate a voltage overshoot according to an embodiment.

DETAILED DESCRIPTION

Figure 1:
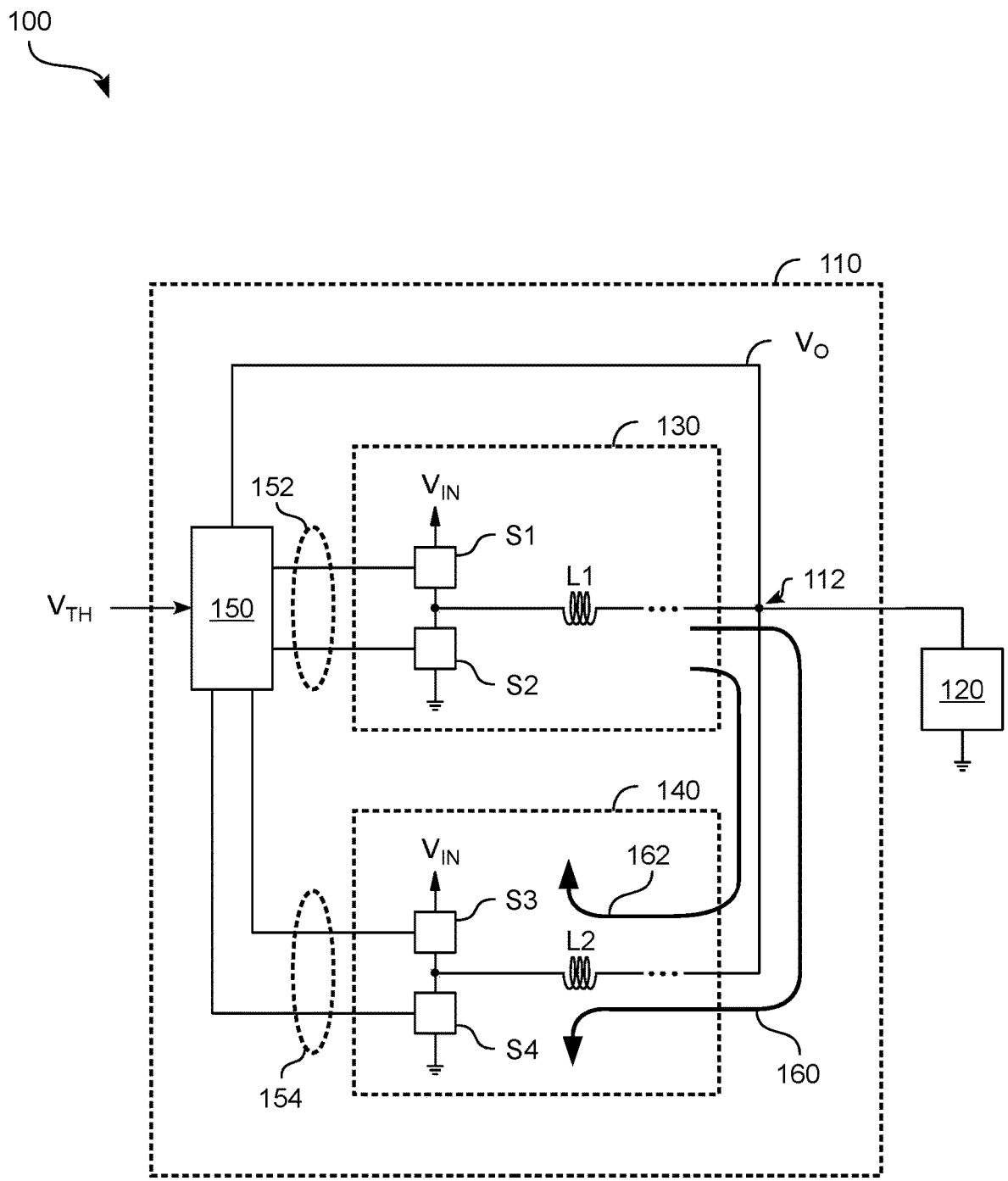
FIG. 1 is a hybrid circuit and functional block diagram illustrating elements of a device to provide voltage overshoot mitigation according to an embodiment.

Embodiments discussed herein variously provide techniques and mechanisms for configuring switch circuitry of a voltage regulator (VR) to mitigate a duration or a magnitude of a voltage overshoot condition. In an embodiment, first circuitry of a VR is operable to provide buck converter functionality for outputting a regulated supply voltage. In response to detecting an overshoot condition of the output voltage, control circuitry of the VR may generate signaling to configure respective switch states of both the first circuitry and second circuitry of the VR. Such switch states may enable a conductive path by which energy is to be dissipated using respective inductors of the first circuitry and the second circuitry. In some embodiments, mitigating a voltage overshoot comprises the VR being alternatively toggled between two configurations each to enable a different respective conductive path.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

It is pointed out that those elements of the figures having the same reference numbers (or names) as the elements of any other figure can operate or function in any manner similar to that described, but are not limited to such.

FIG. 1 shows features of a device 100 to mitigate a voltage overshoot condition according to an embodiment. Device 100 is one example of an embodiment wherein switch circuitry is operable selectively provide a conductive path to a voltage regulator in response to an overshoot of an output voltage. Such a conductive path may help mitigate a duration or a magnitude of the voltage overshoot by enabling energy to be dissipated or otherwise transferred from one or more circuit elements used to provide the regulated output voltage.

As shown in FIG. 1, device 100 comprises a load circuit 120 and a voltage regulator (VR) 110 coupled to provide a voltage to load circuit 120 via a node 112. For example, circuitry 130 of VR 110 may be configured to provide at node 112 a regulated output voltage $V_O$ based on an input voltage $V_{IN}$ which is provided to VR 110. Circuitry 130 comprises an inductor L1 and switch circuits S1, S2 variously coupled to inductor L1. In one embodiment, switch circuit S1 is coupled between inductor L1 and a first node by which VR 110 is to receive an input voltage $V_{IN}$—e.g., wherein switch circuit S2 is coupled between inductor L1 and another node which is to provide a reference potential (such as a ground voltage). In some embodiments, one or more other circuit elements (not shown) of circuitry 130 may be coupled to inductor L1 with node 112. Such one or more other circuit elements—e.g., including a capacitor, a resistor, a current source and/or the like—may facilitate buck circuit functionality of circuitry 130.

During normal operation of VR 110, a control circuit 150 controls when to selectively turn on and/or off switch circuits S1, S2 variously—e.g., using one or more control signals such as the illustrative control signals 152 shown. In this context, the term "normal operation" refers to stable voltage and current draw by load circuit 120—i.e., when output voltage $V_O$ is not overshooting. Normal operation is different from a voltage overshoot situation when load circuit 120 suddenly draws less current, causing voltage Vout to overshoot.

Regulation of output voltage $V_O$ with circuitry 130 may include control circuit 150 providing signals 152 to selectively turn on/off switch circuits S1, S2 at various respective times. For example, the switching of current through main inductor L1 and charging/discharging of a capacitor (not shown) by circuitry 130 may facilitate stability of output voltage $V_O$. Such control of switch circuits S1, S2 by control circuit 150 to regulate output voltage $V_O$ may include one or more operations adapted, for example, from conventional buck circuit techniques (which not detailed herein to avoid obscuring certain features of various embodiments).

To enable mitigation of a voltage overshoot event, VR 110 further comprises circuitry 140 which includes another inductor L2 and switch circuits S3, S4 variously coupled to inductor L2. In one embodiment, switch circuit S3 is coupled between inductor L2 and the first node which provides input voltage $V_{IN}$—e.g., wherein switch circuit S4 is coupled between inductor L2 and the reference potential (e.g., a ground). Accordingly, inductors L1 and L2 may be coupled to the first node via switch circuits S1 and S3, respectively—e.g., where second node 112 is coupled to switch circuits S1 and S3 via inductors L1 and L2, respectively. In one such embodiment, inductors L1 and L2 are further coupled to the reference potential node via switch circuits S2 and S4, respectively. Although some embodiments are not limited in this regard, circuitry 140 may further comprise one or more other circuit elements (not shown) coupled between inductor L2 and node 112.

Control circuit 150 may provide functionality to detect a voltage overshoot condition and, in response, to operate one or both of circuitry 130 and circuitry 140 in aid of mitigating one or both of a duration or a magnitude of a voltage overshoot condition. In one embodiment, control circuit 150 is coupled to sample output voltage $V_O$ or otherwise receive a feedback based on output voltage $V_O$. Mitigation of a voltage overshoot using circuitry 140 may be based on such feedback. For example, control circuit 150 may include or otherwise have access to comparator circuitry which performs a comparison based on voltage $V_O$ and a threshold voltage VIE which indicates a voltage overshoot condition. At some point in time, a result of such a comparison may indicate an overshoot of output voltage $V_O$. In response, control circuit 150 may signal whether and/or when to selectively turn on/off various ones of switch circuits S1, S2, S3, S4. Operation of switch circuits S3, S4 may be provided using one or more control signals such as the illustrative control signals 154 shown.

In one embodiment, mitigation of a voltage overshoot using control signals 152, 154 includes signaling one or more configurations of circuitry 130 and circuitry 140 each at a respective time. Such one or more configurations may each enable a respective conductive path to dissipate or otherwise transfer energy from circuitry 130 by conducting current between circuitry 130 and circuitry 140 via node 112.

For example, a first configuration may enable a conductive path 160—through each of inductor L1, node 112, inductor L2 and switch circuit S4—to the node which provides the reference potential (e.g., a ground). This first configuration may comprise an off-state of the switch circuit S3 during respective on-states of switch circuits S2 and S4—e.g., where the on-state of switch circuit S2 enables a return current path between a ground potential and inductor L1. In an embodiment, such a first configuration may further comprise an off-state of switch circuit S1 to provide at least partial isolation of inductor L1 from input voltage $V_{IN}$.

Alternatively or in addition, a second configuration may enable a conductive path 162 through each of inductor L1, node 112, inductor L2 and switch circuit S3, to the node which provides input voltage $V_{IN}$. This second configuration may comprise an off-state of the switch circuit S4 during respective on-states of switch circuits S2 and S3. In an embodiment, such a second configuration may further comprise an off-state of switch circuit S1 to provide at least partial isolation of inductor L1 from input voltage $V_{IN}$. In one such embodiment, mitigation of a voltage overshoot may include control circuit 150 alternating multiple times between the above-described first configuration and the second configuration. This alternating between configurations may enable energy to be dissipated or otherwise transferred with inductor L1 (e.g., including energy dissipated or otherwise transferred from a capacitor of circuitry 130) to facilitate a decrease in the output voltage $V_O$.

In various embodiments, load circuit 120 includes any of various integrated circuitry—e.g., including one or more processor cores, a memory, a graphics processor, and/or the like—which operate using a regulated supply voltage. Some embodiments are not limited to a particular functionality that is to be provided by load circuit 120. Some or all of load circuit 120, control circuit 150, or switch circuits S1, S2, S3, and S4 may be implemented with an integrated circuit (IC) chip of device 100—e.g., wherein inductor L1 and/or inductor L2 are coupled to (but distinct from) the IC chip. For example, such an IC chip may be disposed in a package material of device 100, wherein inductor L1 and/or inductor L2 are variously disposed in or on the package material. In various alternative embodiments, device 100 omits, but is to couple to, load circuit 120.

FIG. 2 shows features of a method 200 to mitigate a duration or a magnitude of a voltage overshoot event according to an embodiment. Method 200 may include operations performed by circuitry such as that of device 100, for example. To illustrate certain features of various embodiments, method 200 is described herein with reference to circuit conditions which are illustrated by a timing diagram 300 of FIG. 3. However, the operations of method 200 may result in any of a variety of additional or alternative circuit conditions, in other embodiments.

As shown in FIG. 2, method 200 includes (at 210) providing a first voltage via a first node to a voltage regulator (VR) which comprises inductors L1 and L2 coupled to the first node via switch circuits S1 and S3, respectively. In one such embodiment, the second node is coupled to switch circuits S1 and S3 via inductors L1 and L2, respectively, and inductors L1 and L2 are further coupled to a third node via switch circuits S2 and S4, respectively. The third node provides a reference potential such as a ground voltage. Referring to the embodiment illustrated by device 100, the providing at 210 may include providing input voltage $V_{IN}$ to VR 110.

Figure 3:
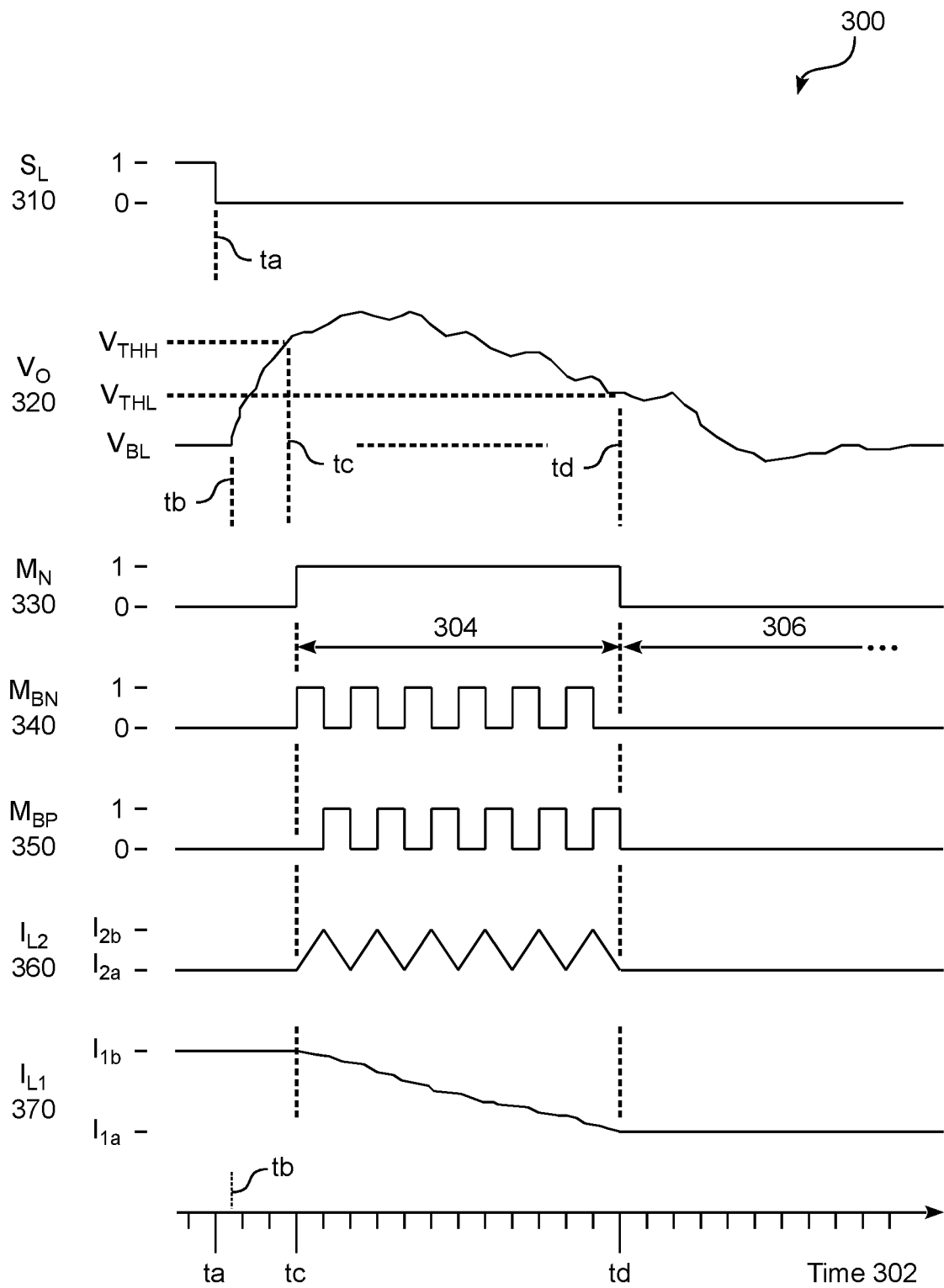
FIG. 3 is a timing diagram illustrating various conditions of a circuit during mitigation of a voltage overshoot event according to an embodiment.

Method 200 may further comprise (at 220), the VR providing a second voltage via the second node to a load circuit, wherein the second voltage is based on the first voltage. Providing the second voltage at 220 may comprise, for at least some period of time, conducting current with inductor L1 during respective off-states of switch circuits S2, S3, and S4. In one embodiment, an integrated circuit (IC) chip comprises switch circuits S1, S2, S3 and S4 and the load circuit—e.g., where the IC chip is in a package mold, and wherein inductors L1 and L2 are each in or on the packaged mold and electrically coupled to the IC chip. The providing at 220 may include VR 110 providing output voltage $V_{OUT}$ to node 112. Referring now to FIG. 3, timing diagram 300 shows various circuit conditions during a voltage mitigation process according to an embodiment. Conditions illustrated by timing diagram 300 may include some of those at device 100, for example. As shown in FIG. 3, timing diagram 300 shows a plot 320, over a time domain 302, of an output voltage $V_O$ (e.g., the second voltage provided at 220) which is provided by a VR to a load circuit.

In an embodiment, method 200 further comprises (at 230) detecting an indication of a voltage overshoot condition. The detecting at 230 may be based on a sampling of the second voltage or any of various other feedback signals based on the second voltage. In an embodiment, the detecting at 230 may comprise control circuit 150 performing a comparison to determine whether the second voltage exceeds a predefined threshold voltage level of an overshoot condition.

For example, referring again to FIG. 3, output voltage $V_O$ may begin to climb above a voltage level (such as the illustrative level $V_{THH}$ shown) which is predefined as a threshold for a voltage overshoot condition to be mitigated. Timing diagram 300 further shows a plot 310 of a signal SL which controls or otherwise indicates, at a given time, one of a high current mode or a low current mode of the load circuit which receives output voltage $V_O$ from the VR. In the example embodiment shown, a transition of signal SL from a high logic state "1" to a low logic state "0" at a time ta may indicate a transition of the load circuit from a high current mode to a low current mode. In such an embodiment, output voltage $V_O$ may begin to climb at some time tb from some stable baseline voltage $V_{BL}$ in response to the transition of signal SL at time ta. The detecting at 230 may comprise control circuit 150 or other such logic receiving an indication that output voltage $V_O$ has transitioned past level $V_{THH}$—e.g., at the illustrative time tc shown.

Method 200 may further comprise (at 240) enabling a conductive path, in response to the indication detected at 230, between inductor L1 and one of first node or the third node via the second node and inductor L2. In an embodiment, the enabling at 240 includes providing respective on-states of switch circuit S2 and one of switch circuits S3 or S4. The enabling at 240 may include control circuit 150 configuring circuitry 130 (and circuitry 140, in some embodiments) to enable one of conductive paths 160, 162.

Referring again to FIG. 3, timing diagram 300 further shows plots 330, 340, 350 of control signals $M_N$, $M_{BN}$, and $M_{BP}$ which are to operate (respectively) switch circuits S2, S3, and S4. In response to output voltage $V_O$ transitioning past $V_{THH}$, switch circuitry may be configured to enable a conductive path to dissipate energy from one or more circuit elements using inductor L1. By way of illustration and not limitation, enabling the circuit path may comprise configuring an on-state of switch S2 by asserting $M_N$—e.g., at least during a period of time 304 to bring down the level of output voltage $V_O$. Enabling the circuit path may further comprise configuring an on-state of switch S3 by asserting $M_{BP}$ or by configuring an on-state of switch S4 by asserting $M_{BN}$.

In some embodiments, responding to detecting at 230 comprises transitioning between a first configuration and a second configuration which each enable a respective conductive path to dissipate energy with the inductor L1. For example, the first configuration may comprise an off-state of the switch circuit S3 which is concurrent with respective on-states of switch circuits S2 and S4. Such a first configuration may enable conductive path 160, for example. The second configuration may comprise an off-state of the switch circuit S4 during respective on-states of switch circuits S2 and S3 (e.g., to enable conductive path 162). Transitioning between the first configuration and the second configuration may be based on a threshold parameter which, for example, indicates a maximum duration of an on-state of the one of switch circuits S3 and S4. Alternatively or in addition, transitioning between the first configuration and the second configuration may be based on a threshold parameter which indicates a minimum time between a state transition by the one of switch circuits S3 and S4 and a state transition by the other of switch circuits S3 and S4. In some embodiments, method 200 toggles multiple times between the first configuration and the second configuration in response to the detecting at 230.

Referring again to FIG. 3, timing diagram 300 further shows both a plot 360 of a current $I_{L2}$ through inductor L2 and a plot 370 of a current $I_{L1}$ through inductor L1. During time period 304, $M_{BN}$ and $M_{BP}$ may be variously asserted a different respective times to alternately direct current $I_{L2}$ through switch circuit S3 or switch circuit S4. In such an embodiment, current $I_{L2}$ may increase during an on-state of S4—e.g., when current $I_{L2}$ is being directed through switch circuit S4 toward a ground potential node—and may decrease during other time periods when an on-state of switch circuit S3 is configured. As a result, current $I_{L2}$ may vary between two current levels $I_{2a}$, $I_{2b}$ in time period 304, during which energy can be dissipated from one or more capacitors of the VR (and/or from one or more capacitors of the load circuit). As a result, current $I_{L1}$ may be decreased from some level $I_{1b}$ toward some lower level $I_{1a}$.

In some embodiments, method 200 further comprises other operations (not shown) to transition the VR from a mode which mitigates a voltage overshoot to another mode whereby the VR is to resume providing an again-stable second voltage to the load circuit. Such other operations may include detecting a condition—referred to herein as a "voltage overshoot mitigation condition"—after the enabling of the conductive path at 240. The voltage overshoot mitigation condition may include the second voltage being under a predefined threshold voltage which, for example, is the same as (or alternatively, different from) a threshold voltage of the voltage overshoot condition detected at 230. In one such embodiment, the voltage overshoot condition comprises the second voltage being greater than a first voltage threshold, wherein the voltage overshoot mitigation condition comprises the second voltage being less than a second voltage threshold which is less than the first voltage threshold. In response to detection of the voltage overshoot mitigation condition, control circuitry of the VR (e.g., control circuit 150) may configure respective off-states of switch circuit S2, S3 and S4 and enable an on-state of switch circuit S1.

Referring again to FIG. 3, output voltage $V_O$ may decrease to a second level $V_{THL}$ which is predefined as a threshold corresponding to the mitigation of a voltage overshoot condition. In response to output voltage $V_O$ dropping below $V_{THL}$ (e.g., at the illustrative time td shown) respective off-states of switch circuits S2, S3, and S4 may be configured using $M_N$, $M_{BN}$ and $M_{BP}$. In such an embodiment, an on-state of switch circuit S1 may be configured to resume a normal operation mode of the VR during a time period 306.

Figure 4:
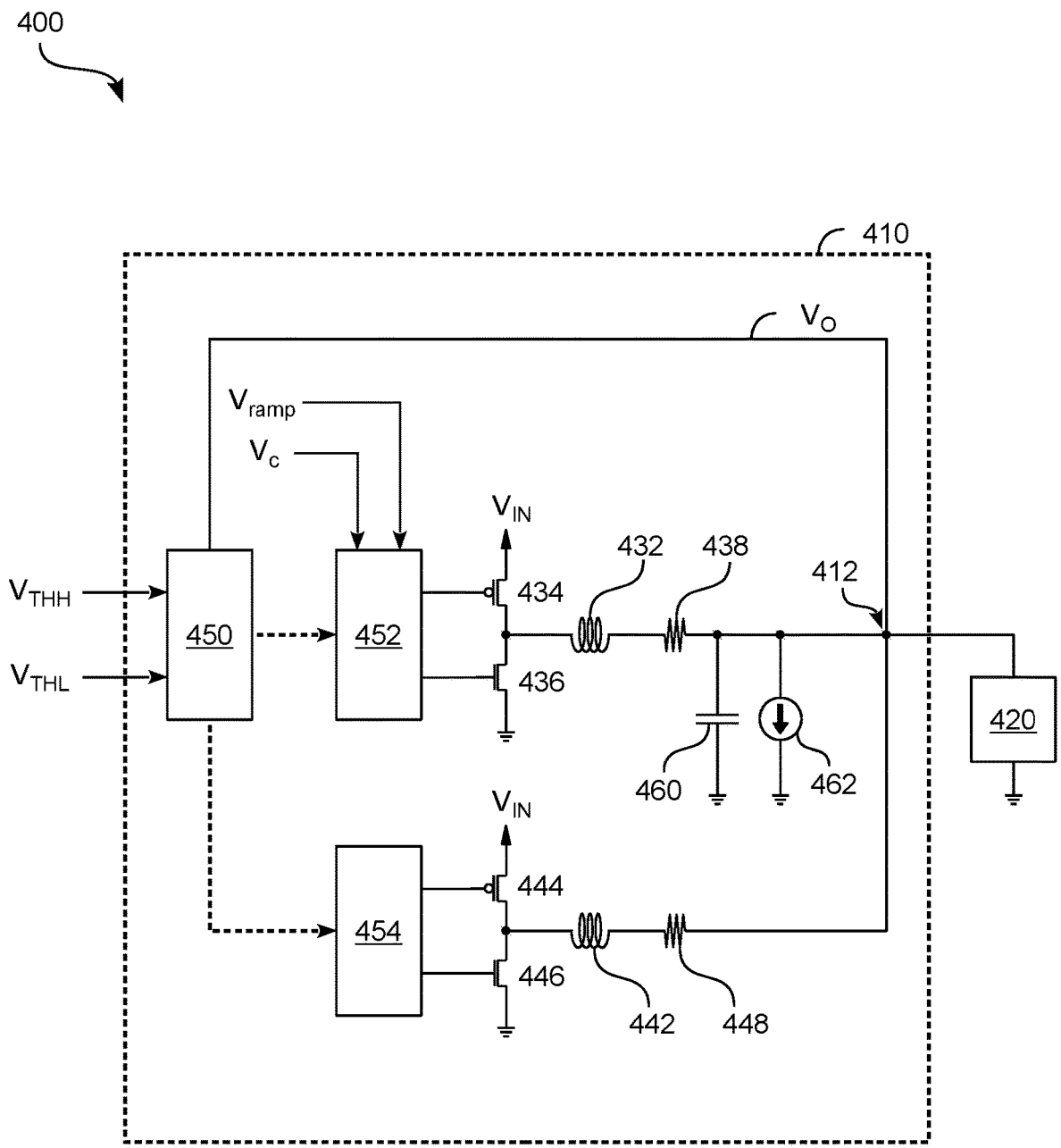
FIG. 4 is a hybrid circuit and functional block diagram illustrating elements of a packaged device to provide voltage overshoot mitigation according to an embodiment.

FIG. 4 shows features of a packaged device 400 to provide a regulated supply voltage according to an embodiment. Packaged device 400 is one example of an embodiment wherein circuitry is configured to mitigate a voltage overshoot by enabling a conductive path to dissipate energy from a capacitor of a voltage regulator. Packaged device 400 may include some or all of the features of device 100, for example, and may perform operations such as those of method 200.

As shown in FIG. 4, packaged device 400 comprises a load circuit 420 and a voltage regulator (VR) 410 which is coupled to provide a voltage to load circuit 420 via a node 412. For example, buck converter circuitry of VR 400 (the buck converter circuitry having features of circuit 130, for example) may comprise an inductor 432, a PMOS transistor 434, and an NMOS transistor 436 with which to provide a regulated voltage $V_O$ based on an input voltage $V_{IN}$ which is provided to VR 410. In one embodiment, inductor 432, transistor 434, and transistor 436 correspond functionally to inductor L1, switch circuit S1, and switch circuit S2 (respectively) of device 100. Such buck converter circuitry may further comprise a resistor 438, a capacitor 460, and a current source 462 which facilitate stability of voltage $V_O$. However, any of a variety of additional or alternative buck converter circuit architectures may be adapted with VR 410, in other embodiments.

To enable mitigation of a voltage overshoot event at node 412, VR may 410 further comprise boost converter circuitry (having features of circuit 140, for example) comprising an inductor 442, a PMOS transistor 444, and an NMOS transistor 446. In one such embodiment, inductor 442, transistor 444, and transistor 446 correspond functionally to inductor L2, switch circuit S3, and switch circuit S4 (respectively) of device 100.

Control circuitry of VR 410 (having features of control circuit 150, for example) may comprise detector circuitry 450 to perform an evaluation of voltage $V_O$ based on one or more threshold voltage levels. For example, detector circuitry 450 may be coupled to compare a sample of voltage $V_O$ to one or each of a threshold voltage level $V_{THH}$ or a threshold voltage level $V_{THL}$ (e.g., as described herein with reference to timing diagram 300). Such control circuitry of VR 410 may further comprise buck control circuitry 452 and boost control circuitry 454 which, based on the evaluation by detector circuitry 450, are to variously configure respective on/off states of transistors 434, 436, 444, 446.

In one embodiment, signaling by buck control circuitry 452 to control respective states of transistors 434, 436 is further based on a periodic signal (such as the illustrative cyclical ramp signal $V_{ramp}$ shown) and a control voltage signal $V_c$ which—for example—indicates a difference between voltage $V_O$ and some predefined reference voltage. By way of illustration and not limitation, buck control circuitry 452 may provide, based on the signals $V_{ramp}$ and $V_c$, pulse width modulation functionality which, for example, is adapted from conventional power management techniques.

Figure 5:
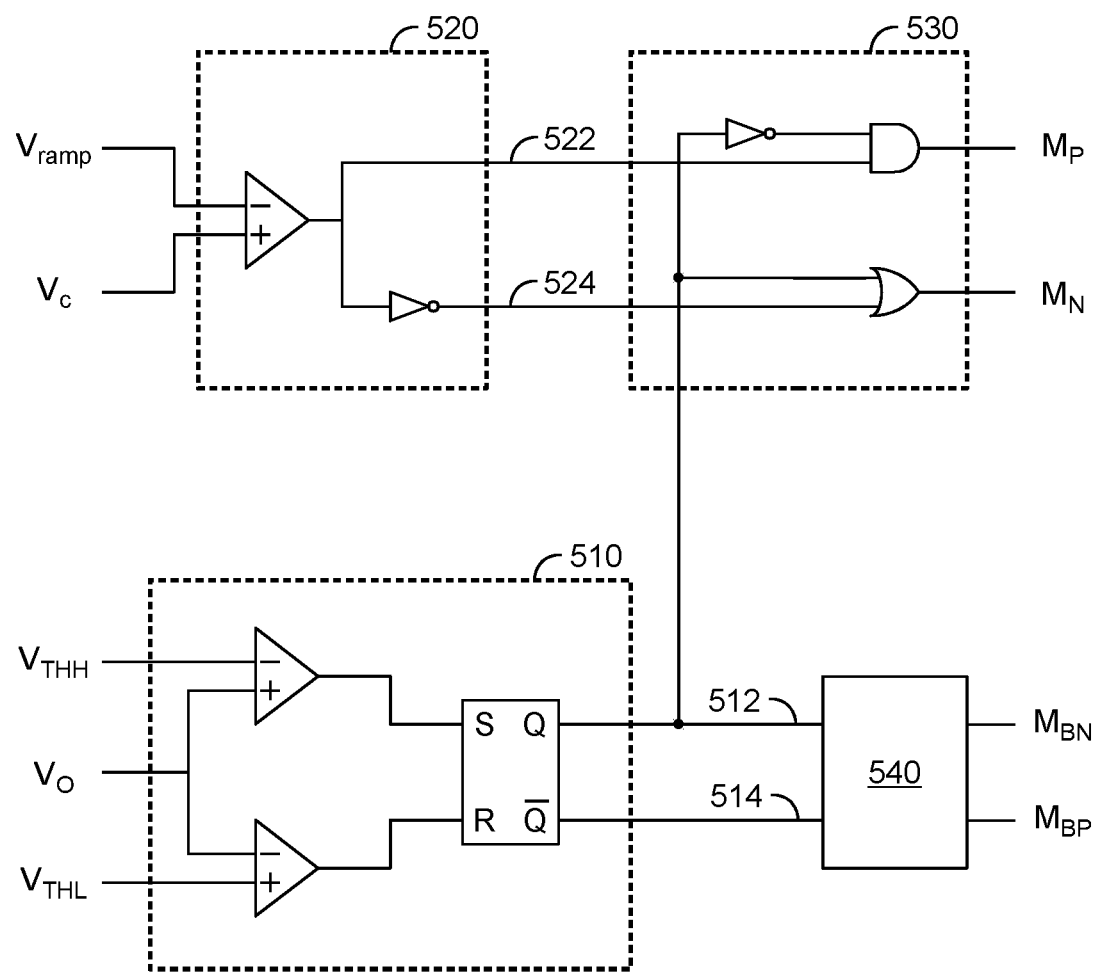
FIG. 5 is a hybrid circuit and functional block diagram illustrating elements of control circuitry to facilitate voltage overshoot mitigation according to an embodiment.

FIG. 5 shows features of control circuitry 500 to configure switch circuits of a voltage regulator according to an embodiment. Control circuitry 500 is one example of an embodiment wherein switch circuits are configured to dissipate energy from buck circuitry in response to a voltage overshoot condition. Control circuitry 500 may include some or all of the features of control circuit 150, for example.

As shown in FIG. 5, control circuitry 500 includes detector circuitry 510, boost control circuitry 540, pulse width modulator circuitry 520, and combinatorial logic 530. Functionality of detector circuitry 510 and boost control circuitry 540 may correspond, for example, to that of detector circuitry 450 and boost control circuitry 454 (respectively)—e.g., wherein functionality of buck control circuitry 452 is provided with pulse width modulator circuitry 520 and combinatorial logic 530.

Operations by buck converter circuitry (not shown) of a VR—e.g., the buck converter circuitry having features of circuitry 130—may be in response to switch control signals $M_P$, $M_N$ which are generated with pulse width modulator circuitry 520, and combinatorial logic 530. For example, control signals $M_P$, $M_N$ may be provided to control—respectively—switches S1, S2 of device 100 or (in another embodiment) transistors 434, 436 of packaged device 400. In one such embodiment, control signals $M_P$, $M_N$ are generated by combinatorial logic 530 based on one or both of signals 522, 524 which are generated with pulse width modulator circuitry 520. In turn, pulse width modulator circuitry 520 may generate signals 522, 524 based on a cyclical ramp signal $V_{ramp}$ and a control voltage signal $V_c$ which indicates a difference between voltage $V_O$ and some predefined reference voltage. The generation of signals 522, 524 may include operations adapted, for example, from conventional pulse width modulation techniques (which are not detailed herein to avoid obscuring certain features of various embodiments).

Detector circuitry 450 may comprise any of a variety of circuits which are operable to indicate whether a regulated supply voltage $V_O$, output by a VR, is above (or alternatively, below) some threshold voltage level. In the example embodiment shown, a first differential amplifier of detector circuitry 510 is to assert a signal in response to voltage $V_O$ being above a threshold level $V_{THH}$—e.g., where a second differential amplifier of detector circuitry 510 is to assert a signal when voltage $V_O$ is below another threshold level $V_{THL}$. In one such embodiment, a SR latch of detector circuitry 510 is variously set or reset based on the respective outputs from these differential amplifiers. For example, the SR latch may set a signal 512 a Boolean high ("1") value when voltage $V_O$ is above the level $V_{THH}$. The signal 512 may subsequently be reset to a Boolean low ("0") value when voltage $V_O$ falls below the level $V_{THL}$. Another signal 514 output by the SR latch may represent a Boolean logical state which is opposite to that of signal 512.

Boost control circuitry 540 may be coupled to provide switch signals $M_{BP}$, $M_{BN}$ based on the signals 512, 514 from detector circuitry. For example, control signals $M_{BP}$, $M_{BN}$ may be provided to control—respectively—switches S3, S4 of device 100 or (in another embodiment) transistors 444, 446 of packaged device 400. In one such embodiment, one or both of control signals $M_{BP}$, $M_{BN}$ is/are generated based on a threshold timing parameter which, for example, indicates a maximum allowed duration of an on-state of the one of switch circuits S3 and S4. Alternatively or in addition, one or both of control signals $M_{BP}$, $M_{BN}$ may be generated based on a threshold parameter which indicates a minimum required time between a state transition by the one of switch circuits S3 and S4 and a state transition by the other of switch circuits S3 and S4. Accordingly, the transitioning between a first configuration of switches and a second configuration of said switches (e.g., the configurations each to enable a different respective one of conductive paths 160, 162) may be based on one or both such threshold timing parameters, in various embodiments. In other embodiments, boost control circuitry 540 is merely a pass-through circuit, a buffer, or is omitted entirely from control circuitry 500—e.g., where signals 512, 514 are switch signals $M_{BN}$, $M_{BP}$, respectively.

In some embodiments, one or both of signals 512, 514 is/are provided to combinatorial logic 530—e.g., to selectively enable/disable the assertion/de-assertion of enable/disable whether and/or when combinatorial logic 530 is to assert (or alternatively, de-assert) a given one of switch control signals $M_P$, $M_N$. For example, an assertion of signal 512 (in response to an indication of a voltage overshoot event) may result in combinatorial logic 530 de-asserting switch control signal $M_P$ and asserting switch control signal $M_N$. While switch control signal $M_P$ is so de-asserted switch control signal $M_N$ is asserted, boost control circuitry 540 may variously toggle logic states of switch signals $M_{BP}$, $M_{BN}$ to provide switch states which facilitate a dissipation of energy from buck circuitry of the VR.

Figure 6:
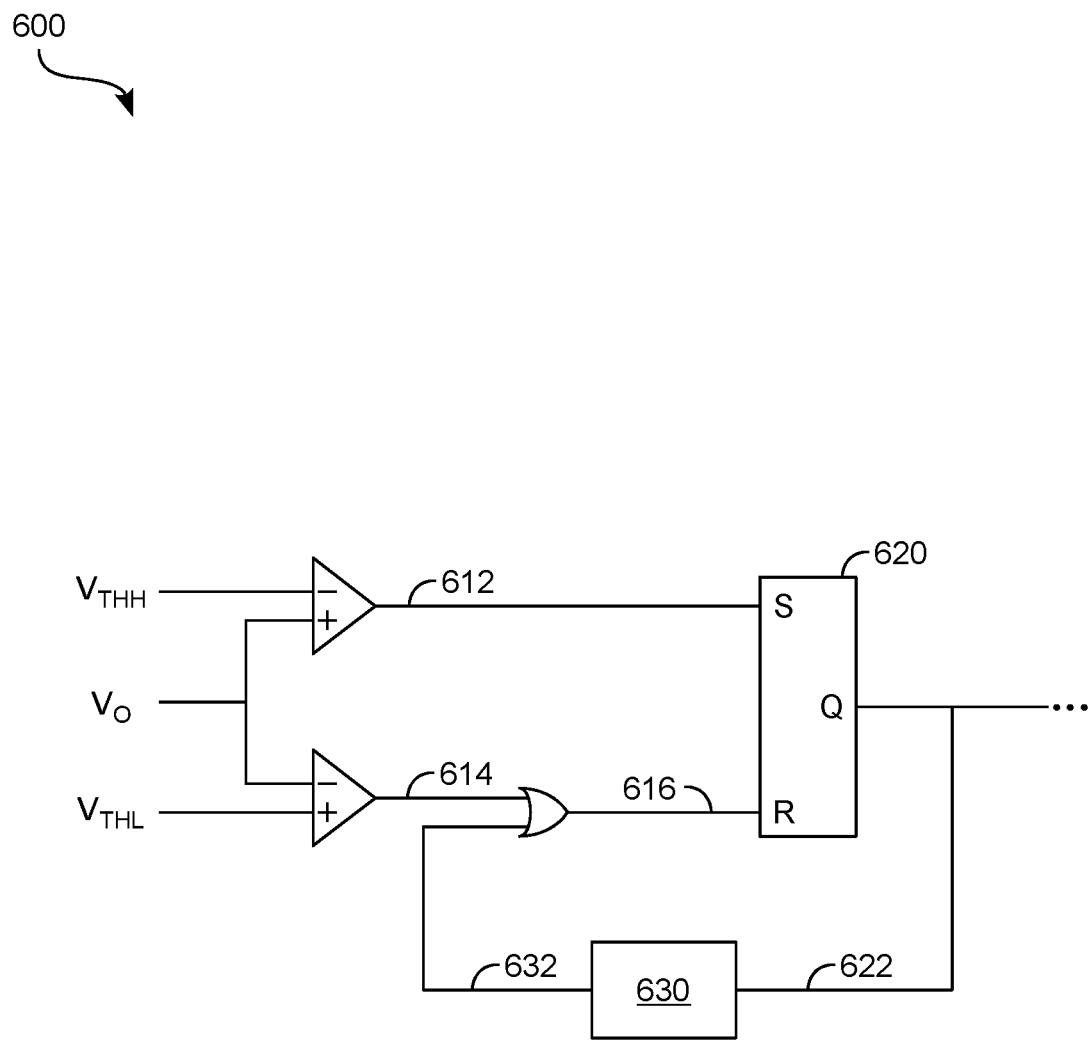
FIG. 6 is a hybrid circuit and functional block diagram illustrating elements of control circuitry to facilitate voltage overshoot mitigation according to an embodiment.

FIG. 6 shows some features of control circuitry 600 to configure switch circuits of a voltage regulator according to an embodiment. Control circuitry 600 may include some or all of the features of control circuit 150, for example. As shown in FIG. 6, control circuitry 600 is coupled to receive each of a voltage $V_O$ which is output by the voltage regulator, a first threshold $V_{THH}$, and a second threshold $V_{THL}$. The received first threshold $V_{THH}$ may be predefined as a reference level for determining whether there an overshoot condition of voltage $V_O$ exists, and the second threshold $V_{THL}$ may be predefined as a reference level for determining whether such an overshoot condition is sufficiently mitigated. Although some embodiments are not limited in this regard, thresholds $V_{THH}$ and $V_{THL}$ may be different from one another—e.g., where threshold $V_{THL}$ is less than threshold $V_{THH}$.

In the example embodiment shown, a first differential amplifier of control circuitry 600 is to assert a signal 612 in response to voltage $V_O$ being above threshold $V_{THH}$—e.g., where a second differential amplifier of control circuitry 600 is to assert a signal 614 when voltage $V_O$ is below threshold $V_{THL}$. Based on an assertion of signal 612, a SR latch 620 of control circuitry 600 may assert an output signal 622 which, for example, corresponds functionally to signal 512. Signal 622 may be provided to switch circuitry (not shown) such as switch circuit S4 or, alternatively, transistor 446—e.g., where signal 622 is to function as control signal $M_{BN}$ in plot 340. In one such embodiment, SR latch 620 further outputs another signal (not shown) which represents a Boolean logical state opposite to that of signal 622—e.g., the other signal to function as control signal $M_{BP}$ in plot 350.

To provide for successive toggling between different switch configurations—e.g., the toggling such as that illustrated during the period of time 304 in timing diagram 300—signal 622 may be further provided to a feedback path back to SR latch 620, the feedback path including a delay circuit 630. In an embodiment, delay circuit 630 provides, as an output 632, a version of signal 622 which is delayed by some predetermined timing parameter. The timing parameter may represent a maximum allowed duration of an on-state of a particular switch or switches (e.g., one of the switch circuits S3 and S4 of circuitry 140). As a result, a signal 616—generated based on the output 632 and signal 614—may reset the SR latch 620 (and thus de-assert signal 612) after the time delay has expired. However, signal 622 may again be asserted if signal 612 continues to indicate an overshoot of voltage $V_O$ after another period of the time delay has expired.

Figure 7:
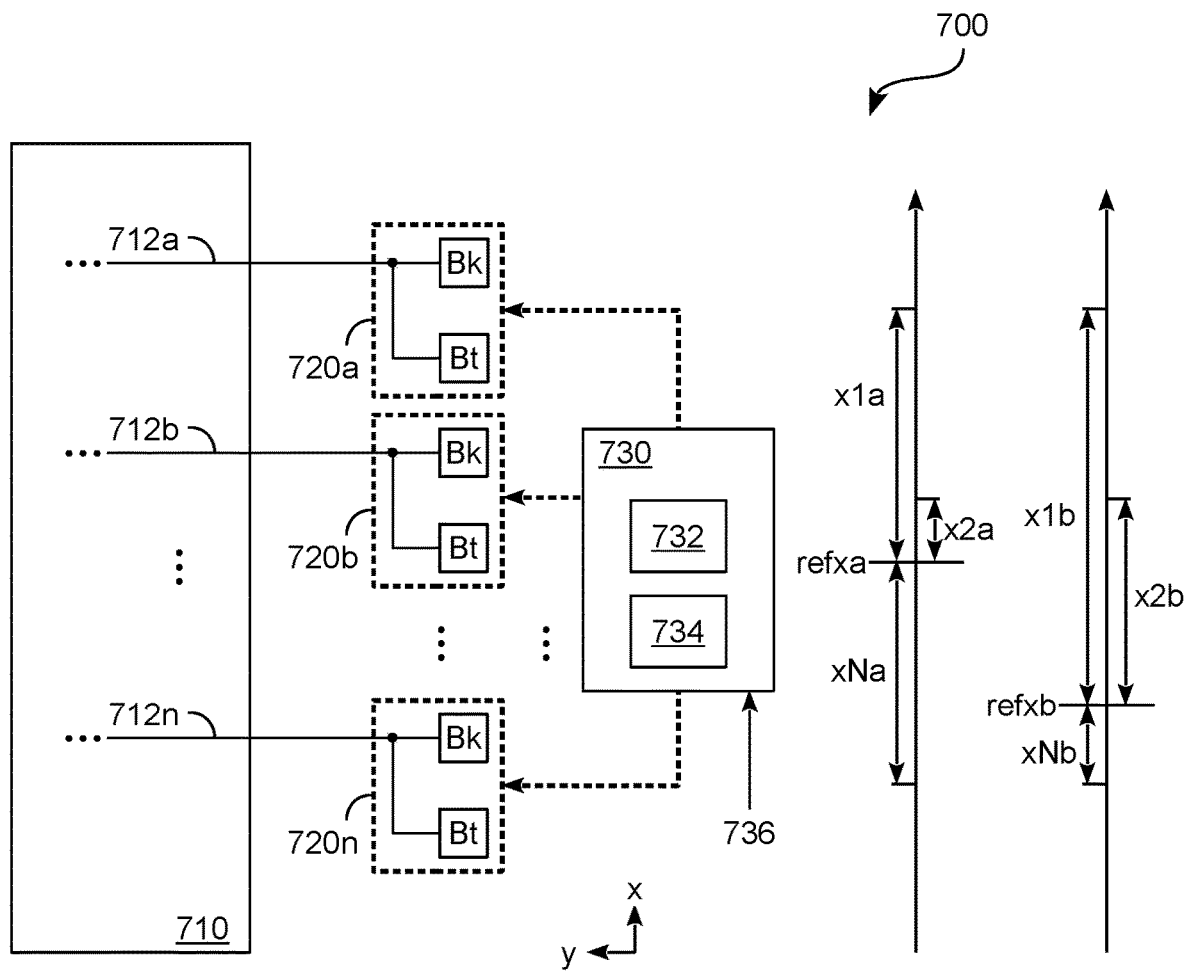
FIG. 7 is a functional block diagram illustrating elements of a packaged device to select circuitry for voltage overshoot mitigation according to an embodiment.

FIG. 7 shows features of a circuit device 700 to operate to mitigate a voltage overshoot with a voltage regulator according to an embodiment. Circuit device 700 may include some or all of the features of device 100 and/or may be operated according to method 200, for example. Circuit device 700 is one example of an embodiment wherein the (re)configuring of one converter circuit is selected over (re)configuring another converter circuit to facilitate voltage overshoot mitigation. Such selective configuration is based on a closer proximity of the one converter circuit to a given reference location—e.g., as compared to that of the other converter circuit.

As shown in FIG. 7, circuit device 700 comprises a load circuit 710 and a plurality of voltage regulator circuits (such as the illustrative VRs 720a, 720b, . . . , 720n shown) coupled thereto. The VRs 720a, 720b, . . . , 720n may be arranged along a given dimension such as the x-dimension of the illustrative x-y coordinate system shown. For example, respective output interconnects 712a, 712b, . . . , 712n from VRs 720a, 720b, . . . , 720n may be arranged in a line along a side of an IC chip which further comprises load circuit 710. Together, the VRs 720a, 720b, . . . , 720n may be operated to provide a stable output voltage to a voltage supply node of load circuit 710—e.g., wherein interconnects 712a, 712b, . . . , 712n form or are otherwise each coupled directly to a voltage supply node.

Two or more of the VRs 720a, 720b, . . . , 720n may each comprise a respective architecture having features of VR 110—e.g., where each such VR has first circuitry and second circuitry corresponding functionally to circuitry 130 and circuitry 140 (respectively). In FIG. 7, circuitry providing functionality of circuitry 130 is represented with the symbol "Bk," and circuitry providing functionality of circuitry 140 is represented with the symbol "Bt." In one such embodiment, control circuitry 730 is coupled to selectively operate respective switch circuits (not shown) of the various Bt circuits and Bk circuits. For a given one of VRs 720a, 720b, . . . , 720n, such selective operation may enable a conductive path to facilitate energy dissipation from a capacitor (for example) of a respective Bk circuit.

To further facilitate voltage overshoot mitigation, control circuitry 730 may select one of VRs 720a, 720b, . . . , 720n over another of VRs 720a, 720b, . . . , 720n for use in mitigating a voltage overshoot condition. Such selecting may be performed based on a first distance between a position of a given VR and a position in load circuit 710 of a source (actual or expected) of voltage overshoot. Alternatively or in addition, such selecting may be performed based on a second distance between a position of that given VR relative and a position of control circuitry 730. Some embodiments are based in part on a realization by the inventors that one or both of these distances may be a source of delay in mitigating voltage overshoot, and that such delay may be avoided by selecting an alternative VR for use in dissipating energy to reduce the output voltage.

In the example embodiment shown, control circuitry 730 includes or is otherwise coupled to access a memory resource or other logic which provides reference information 734. Reference information 734 may correspond VRs 720a, 720b, . . . , 720n each with a respective one or more distances—e.g., where reference information 734 is predefined a priori as part of an initial configuration of circuit device 700. For example, reference information 734 may comprise a table 750 of respective identifiers BB1, BB2, . . . , BBN for VRs 720a, 720b, . . . , 720n. For each of identifiers BB1, BB2, . . . , BBN, table 750 may identify a corresponding distance value ΔXa and/or a corresponding distance value ΔXb. Distance value ΔXa may be equal to or otherwise based on an offset distance (along the x-dimension) between a location of a given VR and a location of control circuitry 730. Distance value ΔXb may be equal to or otherwise based on an offset distance (along the x-dimension) between the location of the given VR and a location of a potential source of voltage overshoot. In this context, "potential source of voltage overshoot" refers to a particular component of load circuit 710 which is capable of transitioning between a relatively high load current operational mode and a relatively low load current operational mode (where such transitioning may contribute to a voltage overshoot).

In such an embodiment, a detector circuit 732 may receive a signal 736 which indicates a location of a source of an actual (or alternatively, an expected upcoming) voltage overshoot condition. Signal 736 may be generated based on operations adapted from any of a variety of conventional power management techniques, for example. In response to signal 736, control circuitry 730 may access reference information 734 to identify a relative preference of one of VRs 720a, 720b, . . . , 720n over one or more others of VRs 720a, 720b, . . . , 720n. Based on the preference, control circuitry 730 may generate control signals to reconfigure switches of a selected VR—e.g., according to the enabling at 240 of method 200.

Figure 8:
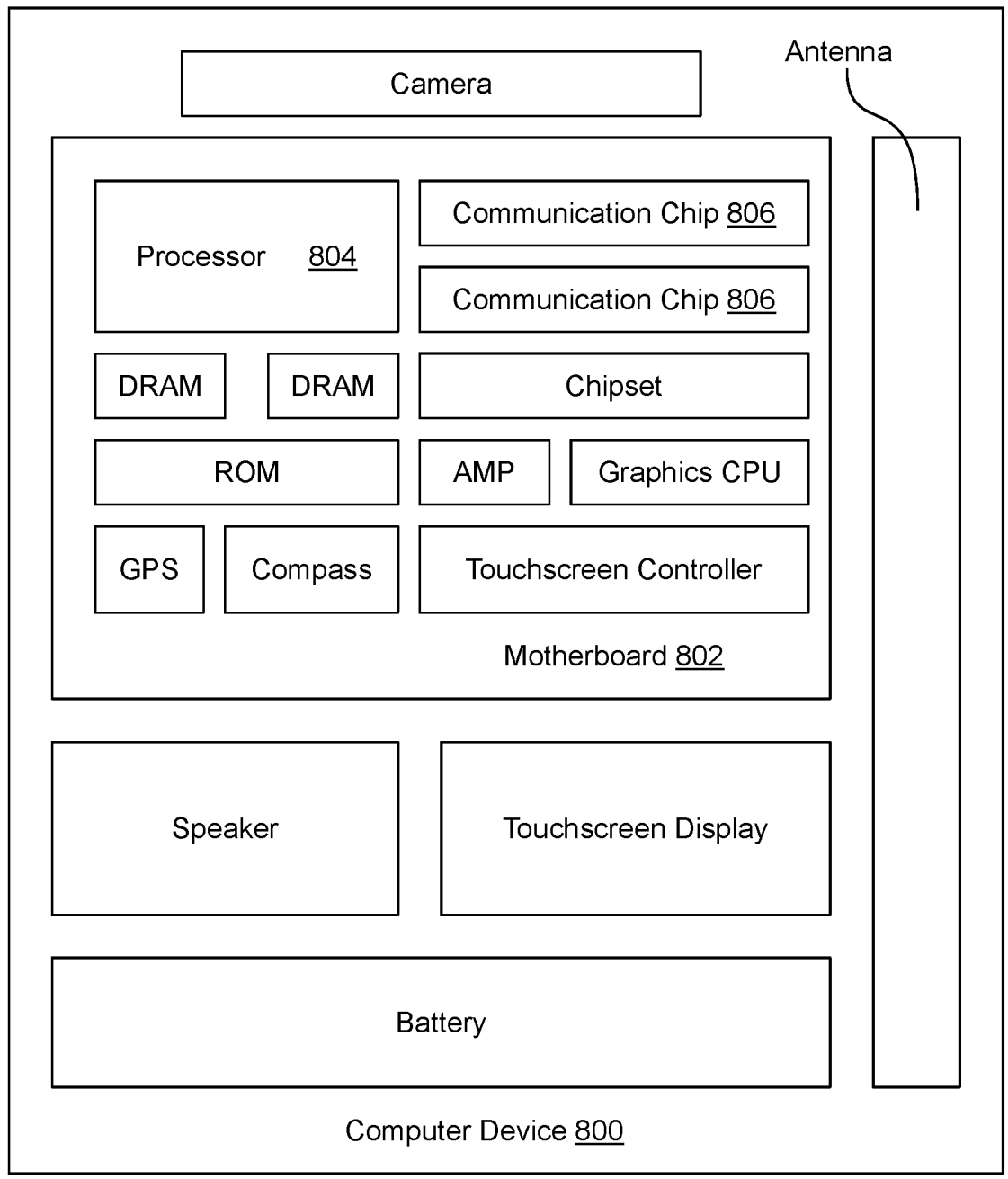
FIG. 8 is a functional block diagram illustrating a computing device in accordance with one embodiment.

FIG. 8 illustrates a computing device 800 in accordance with one embodiment. The computing device 800 houses a board 802. The board 802 may include a number of components, including but not limited to a processor 804 and at least one communication chip 806. The processor 804 is physically and electrically coupled to the board 802. In some implementations the at least one communication chip 806 is also physically and electrically coupled to the board 802. In further implementations, the communication chip 806 is part of the processor 804.

Depending on its applications, computing device 800 may include other components that may or may not be physically and electrically coupled to the board 802. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 806 enables wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 800 may include a plurality of communication chips 806. For instance, a first communication chip 806 may be dedicated to shorter range wireless communications such as Wi-Fi and Bluetooth and a second communication chip 806 may be dedicated to longer range wireless communications such as GPS, EDGE, GPRS, CDMA, WiMAX, LTE, Ev-DO, and others.

The processor 804 of the computing device 800 includes an integrated circuit die packaged within the processor 804. The term "processor" may refer to any device or portion of a device that processes electronic data from registers and/or memory to transform that electronic data into other electronic data that may be stored in registers and/or memory. The communication chip 806 also includes an integrated circuit die packaged within the communication chip 806.

In various implementations, the computing device 800 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 800 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 9:
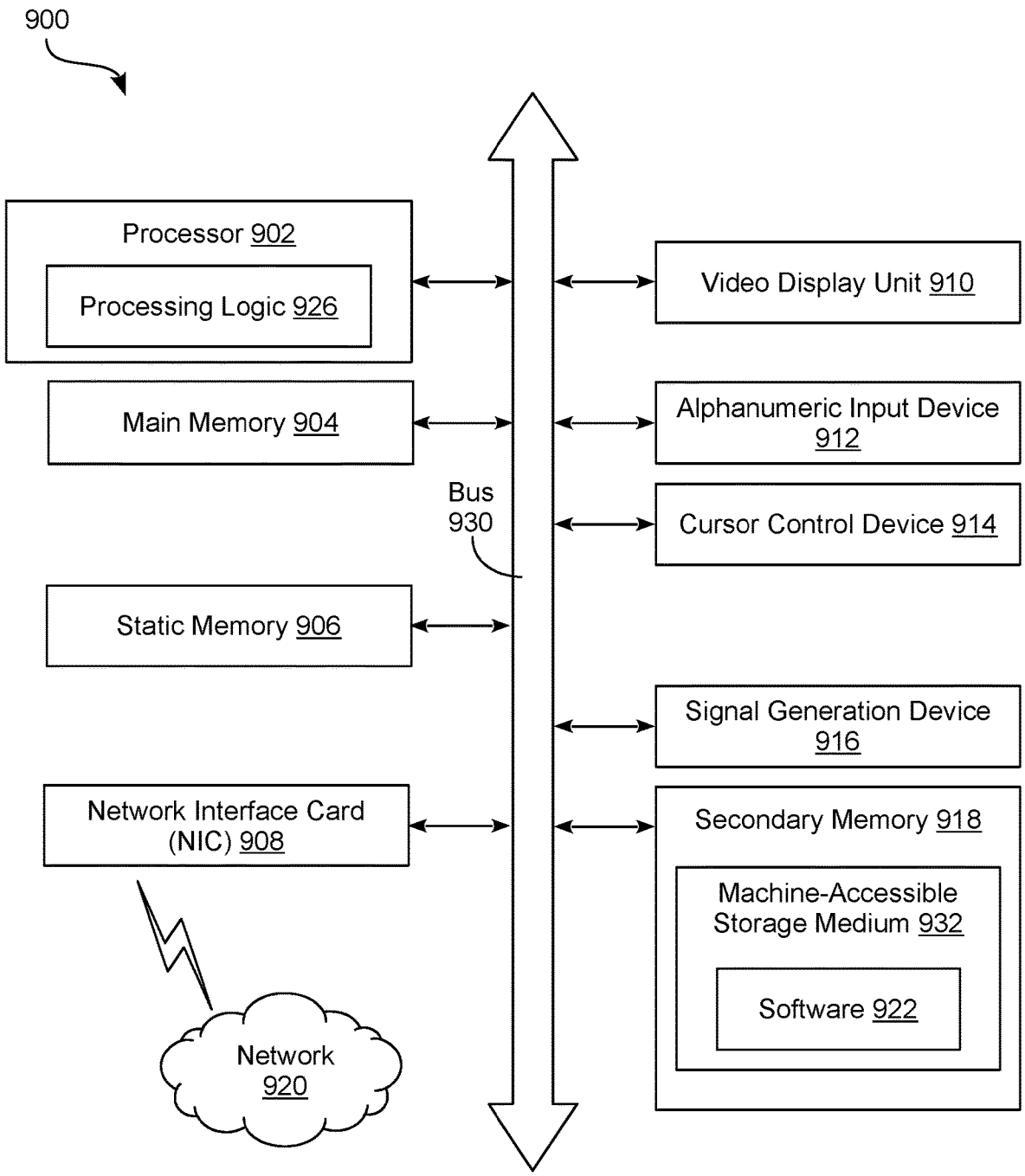
FIG. 9 is a functional block diagram illustrating an exemplary computer system, in accordance with one embodiment.

FIG. 9 illustrates a diagrammatic representation of a machine in the exemplary form of a computer system 900 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations described herein.

The computer system 900 may further include a network interface device 908. The computer system 900 also may include a video display unit 910 (e.g., a liquid crystal display (LCD), a light emitting diode display (LED), or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-accessible storage medium (or more specifically a computer-readable storage medium) 932 on which is stored one or more sets of instructions (e.g., software 922) embodying any one or more of the methodologies or functions described herein. The software 922 may also reside, completely or at least partially, within the main memory 904 and/or within the processor 902 during execution thereof by the computer system 900, the main memory 904 and the processor 902 also constituting machine-readable storage media. The software 922 may further be transmitted or received over a network 920 via the network interface device 908.

While the machine-accessible storage medium 932 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Techniques and architectures for providing a voltage to integrated circuitry are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus to provide a supply voltage, the apparatus comprising:
   a voltage regulator (VR) circuit to receive a first voltage via a first node and, based on the first voltage, to provide a second voltage to a load circuit via a second node, the VR circuit comprising inductors L1 and L2, and switch circuits S1, S2, S3, and S4, the inductors L1 and L2 coupled to the first node via switch circuits S1 and S3, respectively, wherein the second node is coupled to switch circuits S1 and S3 via inductors L1 and L2, respectively, wherein inductors L1 and L2 are further coupled to a third node via switch circuits S2 and S4, respectively, the third node coupled to provide a reference potential; and
   a controller circuit coupled to the VR, wherein, in response to a voltage overshoot condition, the controller circuit is to:
   configure an off-state of switch circuit S1; and
   enable a current path between inductor L1 and one of first node or the third node via the second node and inductor L2, wherein the controller circuit to enable the current path in response to the voltage overshoot condition comprises the controller circuit to signal the VR circuit to provide respective on-states of switch circuit S2 and one of switch circuits S3 or S4, wherein the respective on-states of the switch circuit S2 and the one of switch circuits S3 or S4 are concurrent with each other and with the off-state of switch circuit S1.

2. The apparatus of claim 1, wherein, responsive to the voltage overshoot condition, the controller circuit is to further signal the VR circuit to transition between:
   a first configuration comprising an off-state of the switch circuit S3 during respective on-states of switch circuits S2 and S4; and
   a second configuration comprising an off-state of the switch circuit S4 during respective on-states of switch circuits S2 and S3.

3. The apparatus of claim 1, wherein the controller circuit is to:
   detect a voltage overshoot mitigation condition; and
   in response to the voltage overshoot mitigation condition, signal the VR circuit to provide an on-state of switch circuit S1 and respective off-states of switch circuit S2, S3 and S4.

4. The apparatus of claim 1, wherein, responsive to the voltage overshoot condition, the controller circuit is to:
   generate a first control signal and a second control signal based on the second voltage, a threshold maximum voltage parameter, and an output of a pulse width modulator circuit; and
   provide the first control signal and the second control signal to switch circuits S1 and S2, respectively.

5. The apparatus of claim 1, wherein the VR circuit is a first VR circuit at a first location which, along a dimension, is offset by a first distance from a reference location, the apparatus further comprising a second VR circuit coupled to the load circuit, wherein the second VR circuit is at a second location which, along the dimension, is offset by a second distance from the reference location, wherein, responsive to the voltage overshoot condition, the controller circuit is to select the first VR circuit over the second VR circuit to mitigate a duration or a magnitude of the voltage overshoot condition, wherein the controller circuit is to select the first VR circuit based on the first distance and the second distance.

6. The apparatus of claim 1, wherein an integrated circuit (IC) chip comprises switch circuits S1, S2, S3 and S4 and the load circuit.

7. The apparatus of claim 2, wherein, responsive to the voltage overshoot condition, the controller circuit is to further signal the VR circuit to transition multiple times between the first configuration and the second configuration.

8. The apparatus of claim 2, wherein the controller circuit to signal the VR circuit to transition between the first configuration and the second configuration based on a threshold parameter which indicates a maximum duration of an on-state of the one of switch circuits S3 and S4.

9. The apparatus of claim 2, wherein the controller circuit is to signal the VR circuit to transition between the first configuration and the second configuration based on a threshold parameter which indicates a minimum time between a state transition by the one of switch circuits S3 and S4 and a state transition by the other of switch circuits S3 and S4.

10. The apparatus of claim 3, wherein the voltage overshoot condition comprises the second voltage being greater than a first voltage threshold, and wherein the voltage overshoot mitigation condition comprises the second voltage being less than a second voltage threshold which is less than the first voltage threshold.

11. The apparatus of claim 5, wherein the reference location is a location, along the dimension, of a portion of the load circuit where a voltage overshoot event is indicated.

12. The apparatus of claim 5, wherein the reference location is a location, along the dimension, of the controller circuit.

13. The apparatus of claim 6, wherein the IC chip is in a package mold, wherein inductors L1 and L2 are each in or on the packaged mold and electrically coupled to the IC chip.

14. A system to provide a supply voltage, the system comprising:
   a packaged device comprising:
      a voltage regulator (VR) circuit to receive a first voltage via a first node and, based on the first voltage, to provide a second voltage to a load circuit via a second node, the VR circuit comprising inductors L1 and L2, and switch circuits S1, S2, S3, and S4, the inductors L1 and L2 coupled to the first node via switch circuits S1 and S3, respectively, wherein the second node is coupled to switch circuits S1 and S3 via inductors L1 and L2, respectively, wherein inductors L1 and L2 are further coupled to a third node via switch circuits S2 and S4, respectively, the third node coupled to provide a reference potential; and
      a controller circuit coupled to the VR, wherein, in response to a voltage overshoot condition, the controller circuit is to:
         configure an off-state of switch circuit S1; and
         enable a current path between inductor L1 and one of first node or the third node via the second node and inductor L2, wherein the controller circuit to enable the current path in response to the voltage overshoot condition comprises the controller circuit to signal the VR circuit to provide respective on-states of switch circuit S2 and one of switch circuits S3 or S4, wherein the respective on-states of the switch circuit S2 and the one of switch circuits S3 or S4 are concurrent with each other and with the off-state of switch circuit S1; and
   a display device coupled to the packaged device, the display device to display an image based on a signal communicated with the load circuit.

15. The system of claim 14, wherein, responsive to the voltage overshoot condition, the controller circuit is to further signal the VR circuit to transition between:
   a first configuration comprising an off-state of the switch circuit S3 during respective on-states of switch circuits S2 and S4; and
   a second configuration comprising an off-state of the switch circuit S4 during respective on-states of switch circuits S2 and S3.

16. The system of claim 14, wherein the controller circuit is to:
   detect a voltage overshoot mitigation condition; and
   in response to the voltage overshoot mitigation condition, signal the VR circuit to provide an on-state of switch circuit S1 and respective off-states of switch circuit S2, S3 and S4.

17. The system of claim 14, wherein, responsive to the voltage overshoot condition, the controller circuit is to:
   generate a first control signal and a second control signal based on the second voltage, a threshold maximum voltage parameter, and an output of a pulse width modulator circuit; and provide the first control signal and the second control signal to switch circuits S1 and S2, respectively.

18. The system of claim 14, wherein the VR circuit is a first VR circuit at a first location which, along a dimension, is offset by a first distance from a reference location, the packaged device further comprising a second VR circuit coupled to the load circuit, wherein the second VR circuit is at a second location which, along the dimension, is offset by a second distance from the reference location, wherein, responsive to the voltage overshoot condition, the controller circuit is to select the first VR circuit over the second VR circuit to mitigate a duration or a magnitude of the voltage overshoot condition, wherein the controller circuit is to select the first VR circuit based on the first distance and the second distance.

19. The system of claim 14, wherein an integrated circuit (IC) chip comprises switch circuits S1, S2, S3 and S4 and the load circuit.

20. The system of claim 16, wherein the voltage overshoot condition comprises the second voltage being greater than a first voltage threshold, and wherein the voltage overshoot mitigation condition comprises the second voltage being less than a second voltage threshold which is less than the first voltage threshold.

21. The system of claim 18, wherein the reference location is a location, along the dimension, of a portion of the load circuit where a voltage overshoot event is indicated.

22. The system of claim 18, wherein the reference location is a location, along the dimension, of the controller circuit.

23. The system of claim 19, wherein the IC chip is in a package mold, wherein inductors L1 and L2 are each in or on the packaged mold and electrically coupled to the IC chip.

* * * * *